Aug. 24, 1954
J. H. LANNER
2,686,974
MASONRY GAUGE
Filed April 30, 1953
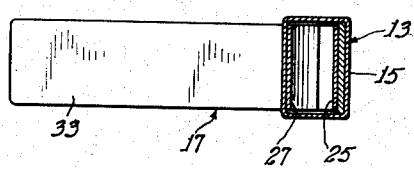
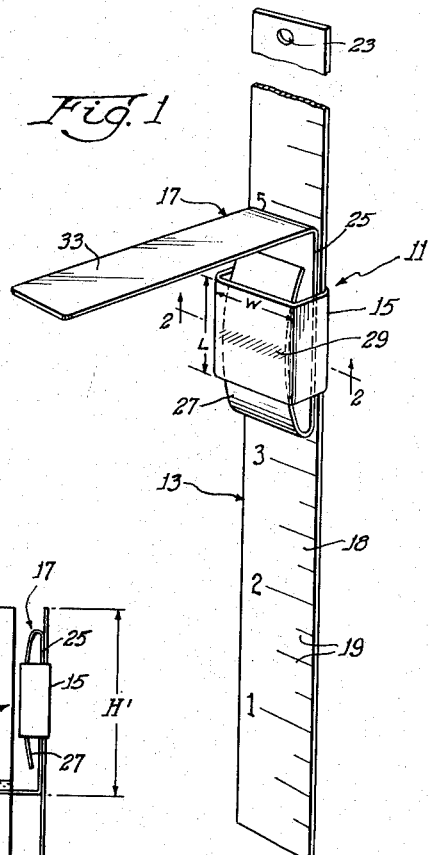
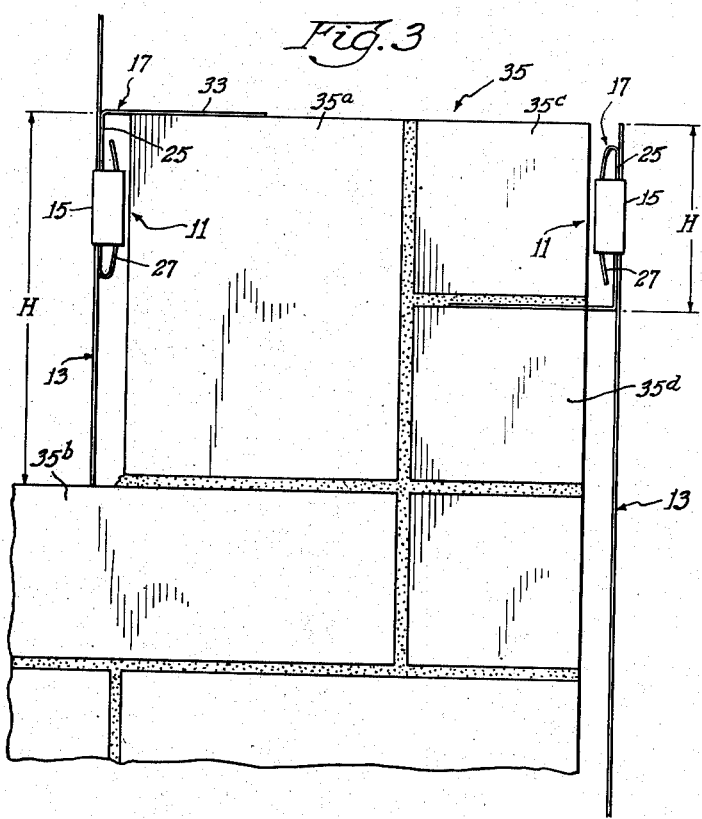
Inventor:
John H. Lanner
By: Soans Glaister & Anderson
Attys.

Patented Aug. 24, 1954

2,686,974

UNITED STATES PATENT OFFICE 2,686,974

MASONRY GAUGE

John H. Lanner, Chicago, Ill.

Application April 30, 1953, Serial No. 352,164

5 Claims. (Cl. 33—173)

The present invention relates generally to a masonry gauge, and more particularly to a mason's height measuring gauge which is particularly suitable for aligning the individual building blocks of a structure during construction.

Workers in the masonry trade heretofore have had no convenient tool for aligning the individual building blocks of a structure during construction. In general, when a mason sets up a course of building blocks, he first places a suitable amount of mortar on the underlying course of building blocks and then places an appropriate block of building material on the mortar. In order to insure that the newly-laid block is set at the proper height, the mason measures the distance from the top of the newly-laid block to the top of the underlying block. The usual practice in the trade has been to use a folding rule for this purpose. In order to perform this measurement, the mason must remove his folding rule from his pocket, unfold the rule and then place it vertically adjacent the side of the building block. The mason then taps down on the block being laid until the top thereof is at the proper height above the underlying block. In order to be sure that the upper surface of the block being laid is horizontal, the mason must measure the height of the top of the block from the underlying block at several points along the block. The mason may then refold the rule and place it back in his pocket or he may leave the rule unfolded and set it aside for future use. This measuring procedure is rather cumbersome, requires a good deal of concentration to make sure that the reading on the scale is accurate, and takes up a substantial portion of the working time of the mason.

The objects of the present invention are to provide an improved masonry gauge which will simplify the work of aligning building blocks as they are set into a building structure; and to provide such a masonry gauge which is simple in construction, economical to manufacture, and efficient for its intended use.

Other objects and advantages of the invention will become apparent from the following description and accompanying drawings in which:

Figure 1 is a perspective view of a masonry gauge formed in accordance with the present invention;

Figure 2 is a sectional view taken along line 2—2 of Figure 1; and

Figure 3 is a front elevational view of a portion of a building structure during construction, showing the manner in which a masonry gauge formed in accordance with the present invention is used to align the blocks being set into the structure.

A masonry gauge 11 formed in accordance with the present invention includes a rule 13, a longitudinally extending sleeve 15 which extends around and is slidable along the rule 13 and an L-shaped shelf member 17, a portion of which extends within the sleeve 15 generally parallel to the rule 13, and a portion of which extends externally of the sleeve 15 at right angles to the rule 13.

The rule 13 is formed from a straight, relatively rigid, elongated bar or rod 18 which is calibrated along its length as indicated at 19 in Figure 1; the rule 13 being constructed out of steel, wood, plastic, or any other material which may be formed into rigid, durable, self-supporting lengths. The rule 13 may be of any suitable length and cross section, the length being normally determined by the size of the building blocks which are to be aligned. The rule 13 is preferably formed from a single strip of material; however, a folding or articulated rule is also possible provided that the unfolded rule has smooth, unbroken faces and edges. If one desires to hang the rule 13 from a hook or the like, the rule may be provided with an appropriately positioned hole 23 at one end thereof.

The sleeve 15 may be formed of any suitable material such as metal, wood, plastic, etc. The bore of the sleeve 15 is sufficiently large so as to accommodate the rule 13 and a portion of the L-shaped shelf member 17 as illustrated in the drawings. In the gauge illustrated in the drawings, the sleeve 15 has a rectangular bore with front and rear walls of a width W approximately equal to that of the rule so that one face of the rule may seat internally along the front or rear wall of the sleeve 15. The sleeve 15 is of sufficient length L so that a substantial surface area of the rule may lie in engagement with one of the internal walls of the sleeve 15.

The L-shaped shelf member 17 may be formed of any suitable, reasonably stiff, resilient material such as spring steel, plastic, etc. The L-shaped shelf member 17 includes a longitudinally extending arm 25 of sufficient length so as to be able to extend through the sleeve 15. The L-shaped shelf member 17 should be suitably shaped so as to lie stably alongside the rule 13. A spring finger 27 extends along a major portion of the length of the arm 25 and connects with one end thereof. The spring finger 27 is spaced from and outwardly bowed with respect to the arm 25.

Normally, the central portion of the spring finger 27 is positioned within the sleeve 15 between the arm 25 and the internal wall of the sleeve 15 opposite to that which is engaged by the rule 13. At least a small area 29 of the spring finger 27 engages the wall of the sleeve 15 pressing thereagainst so as to bias the arm 25 against the rule 13 and causing the rule to frictionally press against the opposite wall of the sleeve 15. If desired, the pring finger may be welded or otherwise attached to the wall of the sleeve at the area of contact 29.

A transverse shelf 33 connects with the upper end of the arm 25. This shelf extends a substantial distance outwardly from the arm 25 and rule 13. The shelf 33 preferably has flat, upper and lower surfaces for seating on a building block during use.

The masonry gauge 11 may be used in various ways to align the building blocks of a structure during construction.

*Method A.*—Figure 3 illustrates a building structure being formed from suitable building blocks 35 (which may be stone, brick, tile, glass, etc.). To align the block 35a on the block 35b, the sleeve 15 and L-shaped shelf member 17 are moved together along the rule 13 until the shelf 33 is positioned at the height H at which one wishes to set the top of the block 35a above the block 35b. A substantial amount of mortar is then set on the block 35b, after which the block 35a is placed on the mortar. The guage 11 is then set vertically with the lower surface of the shelf 33 resting on the upper surface of the block 35b. The block 35a is then tapped downwardly until the bottom of the rule 13 just touches the top of the block 35. During this operation, one may shift the gauge 11 to various positions along the upper surface of the block 35a in order to be sure that the block 35a lies horizontally. This operation is extremely simple and when the blocks to be laid are substantially the same size, it necessitates only a single setting of the gauge.

*Method B.*—Alternatively, under certain circumstances, one may align the blocks 35 being set into a building structure in the following manner. The shelf 33 is set to the proper height H (the distance one wishes to set the top of the block 35c above the block 35b) along the rule. The gauge 11 is set vertically in a reversed manner so that the numbers on the rule increase in a downward direction. The upper surface of the shelf 33 is seated on the surface of the underlying block 35d, mortar is placed on the block 35d, and the block 35c is then set on the mortar. The upper block 35c is tapped downwardly until the upper surface of the block 35c is in line with the edge of the rule 13. Since the mortar has not yet dried, the mason may easily remove the shelf 33 from between the blocks 35c and 35d without moving the blocks or weakening the structure.

In the foregoing, I have described an improved mason's gauge which will simplify the work of aligning building blocks which are being set into a structure. The gauge is simple in construction, easily operable, and economical to manufacture.

Various changes may be made in the described structure without departing from the principles or intended scope of the invention.

I claim:

1. A masonry gauge comprising a flat rule, a longitudinally extending sleeve extending around and slidable along said rule, the opening through said sleeve being of generally rectangular cross section with a width approximately equal to that of said rule, the faces of said rule lying parallel to the front and rear walls of said sleeve, and a generally L-shaped shelf member, said shelf member including a generally flat, longitudinally extending arm of approximately the same width as said rule, said arm extending through said sleeve parallel to the faces of said rule, a spring finger which extends along the major portion of the length of and connects with one end of said arm, said spring finger being spaced from and outwardly bowed with respect to said arm, the central portion of said spring finger extending within said sleeve between said arm and one of the internal walls of said sleeve, said spring finger biasing said arm against said rule so as to force said rule to frictionally engage one of the internal walls of said sleeve, and a shelf which connects with the opposite end of said arm, said shelf extending outwardly from in a direction at right angles to said arm.

2. A masonry gauge comprising a flat rule, a longitudinally extending sleeve extending around and slidable along said rule, the opening through said sleeve being of generally rectangular cross section with a width approximately equal to that of said rule, the faces of said rule lying parallel to the front and rear walls of said sleeve, and a generally L-shaped member formed from a single strip of flexible material of approximately the same width as the width of said opening through said sleeve, said L-shaped member being bent so as to form a generally flat, longitudinally extending arm, a spring finger and a shelf, said arm extending through said sleeve parallel to the faces of said rule, said spring finger extending along the major portion of the length of and connecting with one end of said arm, said spring finger being reversely bent and outwardly bowed with respect to said arm, the central portion of said spring finger extending within said sleeve between said arm and one of the internal walls of said sleeve, said spring finger biasing said arm against said rule so as to force said rule to frictionally engage one of the internal walls of said sleeve, said shelf connecting with the opposite end of said arm, and said shelf extending outwardly from in a direction at right angles to said arm.

3. A masonry gauge comprising a flat rule, a longitudinally extending sleeve extending around and slidable along said rule, the opening through said sleeve being of generally rectangular cross section with a width approximately equal to that of said rule, the faces of said rule lying parallel to the front and rear walls of said sleeve, and a generally L-shaped member formed from a single strip of flexible material of approximately the same width as the width of said opening through said sleeve, and said L-shaped member being bent so as to form a generally flat, longitudinally extending arm, a spring finger and a shelf, said arm extending through said sleeve parallel to the faces of said rule, said spring finger extending along the major portion of the length of and connecting with one end of said arm, said spring finger being reversely bent and outwardly bowed with respect to said arm, the central portion of said spring finger extending within and connected to one of the internal walls of said sleeve, said spring finger biasing said arm against said rule so as to force said rule to frictionally engage one of the internal walls of said sleeve, said shelf connecting with the opposite end of said arm, and said shelf extending outwardly from in a direction at right angles to said arm.

4. An attachment for a flat rule comprising a longitudinally extending sleeve which is adapted to extend around and slide along said rule, the opening through said sleeve being of generally rectangular cross section with a width approximately equal to that of said rule, and a generally L-shaped shelf member, said shelf member included a generally flat, longitudinally extending arm of approximately the same width as said rule, said arm being adapted to extend through said sleeve parallel to the faces of said rule, a spring finger which extends along the major portion of the length of and connects with one end of said arm, said spring finger being spaced from and outwardly bowed with respect to said arm, the central portion of said spring finger being adapted to extend within said sleeve between said arm and one of the internal walls of said sleeve, said spring finger being adapted to bias said arm against said rule so as to force said rule to frictionally engage one of the internal walls of said sleeve, and a shelf which connects with the opposite end of said arm, said shelf extending outwardly from in a direction at right angles to said arm.

5. An attachment for a flat rule comprising a longitudinally extending sleeve which is adapted to extend around and slide along said rule, the opening through said sleeve being of generally rectangular cross section with a width approximately equal to that of said rule, and a generally L-shaped member formed from a single strip of flexible material of approximately the same width as the width of said opening through said sleeve, said L-shaped member being bent so as to form a generally flat, longitudinally extending arm, a spring finger and a shelf, said arm being adapted to extend through said sleeve parallel to the faces of said rule, said spring finger extending along the major portion of the length of and connecting with one end of said arm, said spring finger being reversely bent and outwardly bowed with respect to said arm, the central portion of said spring finger being adapted to extend within said sleeve between said arm and one of the internal walls of said sleeve, said spring finger being adapted to bias said arm against said rule so as to force said rule to frictionally engage one of the internal walls of said sleeve, said shelf connecting with the opposite end of said arm, and said shelf extending outwardly from in a direction at right angles to said arm.

References Cited in the file of this patent

UNITED STATES PATENTS

| Number | Name | Date |
|---|---|---|
| 783,804 | Smith | Feb. 28, 1905 |